US006787967B2

(12) United States Patent
Wang et al.

(10) Patent No.: US 6,787,967 B2
(45) Date of Patent: Sep. 7, 2004

(54) HIGH TEMPERATURE SUPER-CONDUCTING ROTOR COIL SUPPORT AND COIL SUPPORT METHOD

(75) Inventors: Yu Wang, Clifton Park, NY (US); Evangelos Trifon Laskaris, Schenectady, NY (US); Phani K. Nukala, Albany, NY (US)

(73) Assignee: General Electric Company, Schenectady, NY (US)

( * ) Notice: Subject to any disclaimer, the term of this patent is extended or adjusted under 35 U.S.C. 154(b) by 124 days.

(21) Appl. No.: 09/854,940

(22) Filed: May 15, 2001

(65) Prior Publication Data

US 2002/0171325 A1 Nov. 21, 2002

(51) Int. Cl.[7] .............................. H02K 3/46; H02K 9/00
(52) U.S. Cl. ....................... 310/270; 310/261; 310/52; 310/58; 336/197
(58) Field of Search ............................... 310/270, 214, 310/194, 260, 264, 261, 52, 58, 54, 197; 336/197

(56) References Cited

U.S. PATENT DOCUMENTS

| | | | |
|---|---|---|---|
| 4,072,873 A | * | 2/1978 | Nottingham ................. 310/71 |
| 4,277,705 A | * | 7/1981 | Rios ............................ 310/215 |
| 5,532,663 A | | 7/1996 | Herd et al. ................. 335/216 |
| 5,548,168 A | | 8/1996 | Laskaris et al. .............. 310/52 |
| 5,672,921 A | | 9/1997 | Herd et al. .................... 310/52 |
| 5,774,032 A | | 6/1998 | Herd et al. ................. 335/216 |
| 5,777,420 A | | 7/1998 | Gamble et al. ............. 310/261 |
| 5,798,678 A | | 8/1998 | Manlief et al. ............. 335/216 |
| 5,953,224 A | | 9/1999 | Gold et al. ................... 363/98 |
| 6,066,906 A | | 5/2000 | Kalsi .......................... 310/179 |
| 6,140,719 A | | 10/2000 | Kalsi ........................... 310/52 |
| 6,169,353 B1 | | 1/2001 | Driscoll et al. ............. 310/261 |
| 6,173,577 B1 | | 1/2001 | Gold .......................... 62/51.1 |
| 2002/0125787 A1 | | 9/2002 | Howard et al. ............. 310/254 |
| 2003/0011253 A1 | | 1/2003 | Kalsi et al. ................... 310/58 |
| 2003/0011273 A1 | | 1/2003 | Kalsi et al. ................. 310/261 |
| 2003/0011452 A1 | | 1/2003 | Snitchler et al. ............ 335/216 |

* cited by examiner

Primary Examiner—Thomas M. Dougherty
Assistant Examiner—J. Aguirrechea
(74) Attorney, Agent, or Firm—Nixon & Vanderhye, P.C.

(57) ABSTRACT

A rotor for a synchronous machine is disclosed including a rotor core; a super-conducting coil winding extending around the rotor core, the coil winding having a coil end section adjacent an end of the rotor core, and a coil support bracing the end section and being thermally isolated from the rotor core.

27 Claims, 6 Drawing Sheets

HIGH TEMPERATURE SUPER-CONDUCTING ROTOR COIL SUPPORT AND COIL SUPPORT METHOD

RELATED APPLICATIONS

This application is related to the following commonly-owned and commonly-filed applications (the specifications and drawings of each are incorporated herein):

U.S. patent application Ser. No. 09/854,932 entitled "Superconducting Synchronous Machine Having Rotor And A Plurality Of Super-Conducting Field Coil Windings, filed May 15, 2001;

U.S. patent application Ser. No. 09/854,933 entitled "High Temperature Super-Conducting Rotor Coil Support With Split Coil Housing And Assembly Method", filed May 15, 2001;

U.S. patent application Ser. No. 09/854,931 entitled "Synchronous Machine Having Cryogenic Gas Transfer Coupling To Rotor With Super-Conducting Coils", filed May 15, 2001;

U.S. patent application Ser. No. 09/855,026 entitled "High Temperature Super-Conducting Synchronous Rotor Coil Support With Tension Rods And Method For Assembly Of Coil Support", filed May 15, 2001;

U.S. patent application Ser. No. 09/854,946 entitled "High Temperature Super-Conducting Rotor Coil Support With Tension Rods And Bolts And Assembly Method", filed May 15, 2001;

U.S. patent application Ser. No. 09/854,939 entitled "High Temperature Super-Conducting Coils Supported By An Iron Core Rotor", filed May 15, 2001;

U.S. patent application Ser. No. 09/854,938 entitled "High Temperature Super-Conducting Synchronous Rotor Having An Electromagnetic Shield And Method For Assembly", filed May 15, 2001;

U.S. patent application Ser. No. 09/854,937 entitled "High Temperature Super-Conducting Rotor Having A Vacuum Vessel And Electromagnetic Shield And Method For Assembly", filed May 15, 2001;

U.S. patent application Ser. No. 09/854,944 entitled "A High Power Density Super-Conducting Electric Machine", filed May 15, 2001;

U.S. patent application Ser. No. 09/854,943 entitled "Cryogenic Cooling System For Rotor Having A High Temperature Super-Conducting Field Winding", filed May 15, 2001;

U.S. patent application Ser. No. 09/854,464 entitled "High Temperature Super-Conducting Racetrack Coil", filed May 15, 2001; and U.S. patent application Ser. No. 09/855,034 entitled "High Temperature Super Conducting Rotor Power Leads", filed May 15, 2001.

BACKGROUND OF THE INVENTION

The present invention relates generally to a super-conductive coil in a synchronous rotating machine. More particularly, the present invention relates to a support structure for super-conducting field windings in the rotor of a synchronous machine.

Synchronous electrical machines having field coil windings include, but are not limited to, rotary generators, rotary motors, and linear motors. These machines generally comprise a stator and rotor that are electromagnetically coupled. The rotor may include a multi-pole rotor core and one or more coil windings mounted on the rotor core. The rotor cores may include a magnetically-permeable solid material, such as an iron-core rotor.

Conventional copper windings are commonly used in the rotors of synchronous electrical machines. However, the electrical resistance of copper windings (although low by conventional measures) is sufficient to contribute to substantial heating of the rotor and to diminish the power efficiency of the machine. Recently, super-conducting (SC) coil windings have been developed for rotors. SC windings have effectively no resistance and are highly advantageous rotor coil windings.

Iron-core rotors saturate at an air-gap magnetic field strength of about 2 Tesla. Known super-conductive rotors employ air-core designs, with no iron in the rotor, to achieve air-gap magnetic fields of 3 Tesla or higher. These high air-gap magnetic fields yield increased power densities of the electrical machine, and result in significant reduction in weight and size of the machine. Air-core super-conductive rotors require large amounts of super-conducting wire. The large amounts of SC wire add to the number of coils required, the complexity of the coil supports, and the cost of the SC coil windings and rotor.

High temperature SC coil field windings are formed of super-conducting materials that are brittle, and must be cooled to a temperature at or below a critical temperature, e.g., 27° K., to achieve and maintain super-conductivity. The SC windings may be formed of a high temperature super-conducting material, such as a BSCCO ($Bi_xSr_xCa_xCu_xO_x$) based conductor.

Super-conducting coils have been cooled by liquid helium. After passing through the windings of the rotor, the hot, used helium is returned as room-temperature gaseous helium. Using liquid helium for cryogenic cooling requires continuous reliquefaction of the returned, room-temperature gaseous helium, and such reliquefaction poses significant reliability problems and requires significant auxiliary power.

Prior SC coil cooling techniques include cooling an epoxy-impregnated SC coil through a solid conduction path from a cryocooler. Alternatively, cooling tubes in the rotor may convey a liquid and/or gaseous cryogen to a porous SC coil winding that is immersed in the flow of the liquid and/or gaseous cryogen. However, immersion cooling requires the entire field winding and rotor structure to be at cryogenic temperature. As a result, no iron can be used in the rotor magnetic circuit because of the brittle nature of iron at cryogenic temperatures.

What is needed is a super-conducting field winding assemblage for an electrical machine that does not have the disadvantages of the air-core and liquid-cooled super-conducting field winding assemblages of, for example, known super-conductive rotors.

In addition, high temperature super-conducting (HTS) coils are sensitive to degradation from high bending and tensile strains. These coils must undergo substantial centrifugal and other acceleration forces that stress and strain the coil windings. Normal operation of electrical machines involves thousands of start-up and shut-down cycles over the course of several years that result in low cycle fatigue loading of the rotor, and apply bending moments that strain the rotor coil. Furthermore, the HTS rotor coil winding should be capable of withstanding 25% over-speed operation during rotor balancing procedures at ambient temperature, and notwithstanding occasional over-speed conditions at cryogenic temperatures during power generation operation. These over-speed conditions substantially increase the centrifugal force loading on the windings over normal operating conditions.

SC coils used as the HTS rotor field winding of an electrical machine are subjected to stresses and strains during cool-down and normal operation. They are subjected to centrifugal loading, bending moments, torque transmission, and transient fault conditions. To withstand the forces, stresses, strains and cyclical loading, the SC coils should be properly supported in the rotor by a coil support system. These support systems hold the SC coil(s) in the HTS rotor and secure the coils against the tremendous centrifugal and other acceleration forces due to the rotation of the rotor. Moreover, the coil support system protects the SC coils, and ensures that the coils do not prematurely crack, fatigue or otherwise break.

A challenge to the development of a high temperature super-conducting (HTS) electric machine is maintaining the structural integrity of the super-conducting field coil. Due to the brittle coil, the critical current of a BSCCO based coil is sensitive to the level of mechanical strain in the coil. Accordingly, the mechanical strain into the SC coil should be minimized to maintain the optimal level of critical current.

A robust coil support is needed to minimize the mechanical strain in the SC coil for a rotor of a synchronous machine. By minimizing the coil strain, the coil support ensures that the coil retains its critical current capability. In addition to minimizing coil strain, the coil support should not conduct heat from the rotor to the cryogenic coil.

Developing support systems for HTS coil has been a difficult challenge in adapting SC coils to HTS rotors. Examples of coil support systems for HTS rotors that have previously been proposed are disclosed in U.S. Pat. Nos. 5,548,168; 5,532,663; 5,672,921; 5,777,420; 6,169,353, and 6,066,906. However, these coil support systems suffer various problems, such as being expensive, complex and requiring an excessive number of components. There is a long-felt need for a HTS rotor having a coil support system for a SC coil. The need also exists for a coil support system made with low cost and easy-to-fabricate components.

BRIEF SUMMARY OF THE INVENTION

A coil support has been developed that has a split clamp that grasps the ends of a race-track SC coil. The clamp provides rigidity and stiffness to the coil, and prevents the coil from bending during centrifugal acceleration. By stiffening the coil, the clamp minimizes strain in the coil and thereby retains the critical current capability of the coil.

The split clamp is a free-floating attachment to the coil, and is not secured to the rotor. Thus, the split clamp may be held at a cryogenic cold temperature along with the coil. The free-floating clamp is thermally isolated from hot structures such as the rotor core and end shaft collar. The free-floating clamp does not require insulation structures to prevent heat from the rotor from conducting through the clamp into the coil.

The HTS rotor may be for a synchronous machine originally designed to include SC coils. Alternatively, the HTS rotor may replace a copper coil rotor in an existing electrical machine, such as in a conventional generator. The rotor and its SC coils are described here in the context of a generator, but the HTS coil rotor is also suitable for use in other synchronous machines.

The coil support system, including the split clamp, is useful in integrating the coil support system with the coil and rotor. In addition, the coil support system facilitates easy pre-assembly of the coil support system, coil and rotor core prior to final rotor assembly. Pre-assembly reduces coil and rotor assembly time, improves coil support quality, and reduces coil assembly variations.

In a first embodiment, the invention is a rotor for a synchronous machine comprising: a rotor core; a super-conducting coil winding extending around at least a portion of the rotor core, the coil winding having a coil end section adjacent an end of the rotor core, and a coil support bracing the end section and being thermally isolated from the rotor core.

In a second embodiment, the invention is a method for supporting a super-conducting coil winding on a rotor core of a synchronous machine comprising the steps of: bracing an end section of the coil winding with an end coil support; assembling the coil winding, end coil support and rotor core; attaching a rotor end shaft to the rotor core; and thermally isolating the coil support from the rotor core and shaft.

In a third embodiment, the invention is a rotor for a synchronous machine comprising: a rotor core having at least one rotor core end orthogonal to a longitudinal axis of the rotor; at least one end shaft attached to the rotor core end; a race-track super-conducting (SC) coil winding extending around the rotor core and having a coil end section adjacent the rotor end; a coil support brace attached to the coil end section and thermally isolated from the rotor core and rotor end shaft.

BRIEF DESCRIPTION OF THE DRAWINGS

The accompanying drawings in conjunction with the text of this specification describe an embodiment of the invention.

DETAILED DESCRIPTION OF THE INVENTION

Figure 1:
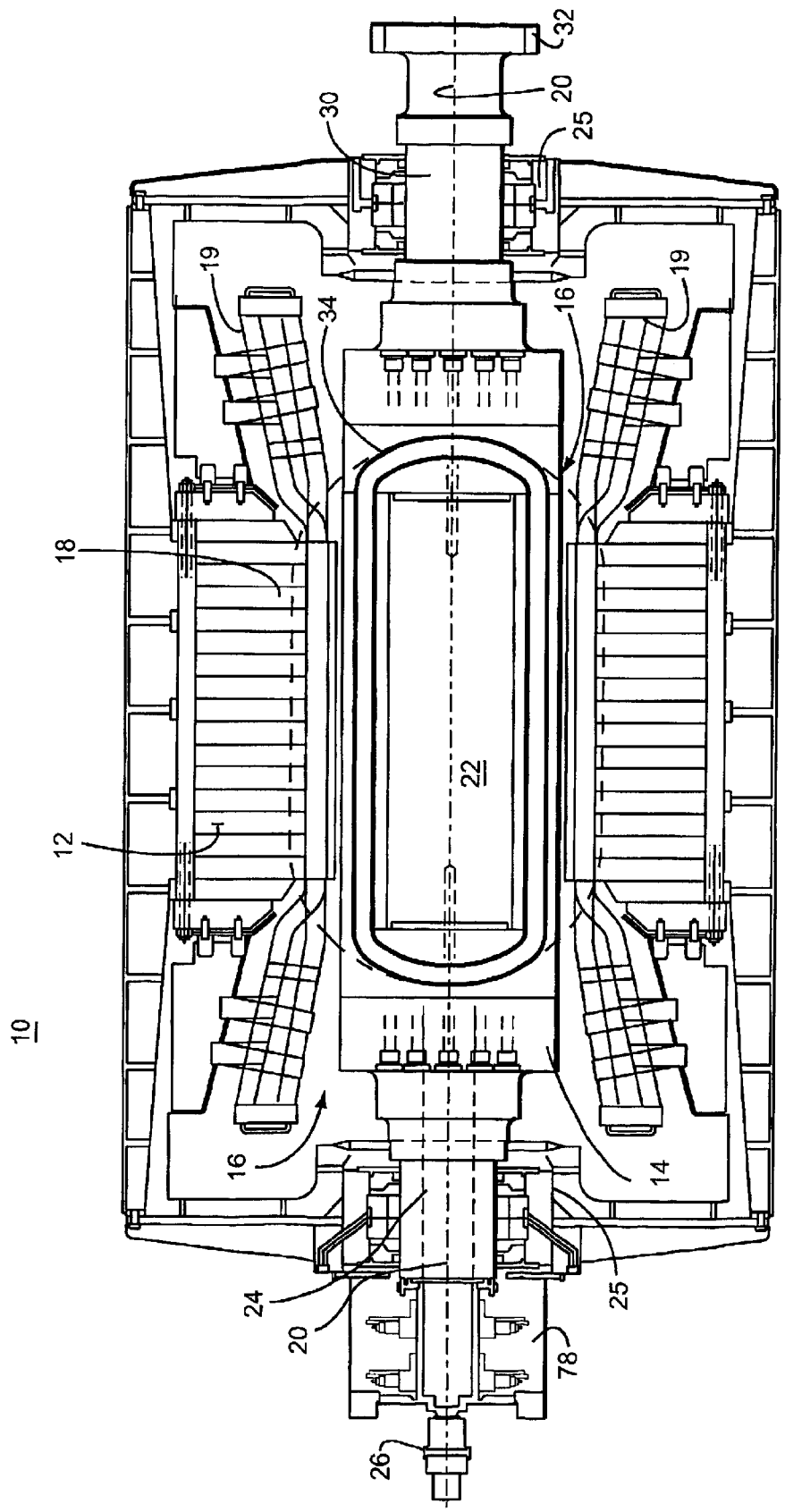
FIG. 1 is a schematic side elevational view of a synchronous electrical machine having a super-conductive rotor and a stator.

FIG. 1 shows an exemplary synchronous generator machine 10 having a stator 12 and a rotor 14. The rotor includes field winding coils that fit inside the cylindrical rotor vacuum cavity 16 of the stator. The rotor fits inside the rotor vacuum cavity of the stator. As the rotor turns within the stator, a magnetic field 18 (illustrated by dotted lines) generated by the rotor and rotor coils moves/rotates through the stator and creates an electrical current in the windings of the stator coils 19. This current is output by the generator as electrical power.

The rotor 14 has a generally longitudinally-extending axis 20 and a generally solid rotor core 22. The solid core 22 has high magnetic permeability, and is usually made of a ferromagnetic material, such as iron. In a low power density super-conducting machine, the iron core of the rotor is used to reduce the magnetomotive force (MMF), and, thus, minimize the amount of super-conducting (SC) coil wire needed for the coil winding. For example, the solid iron rotor core may be magnetically saturated at an air-gap magnetic field strength of about 2 Tesla.

Figure 2:
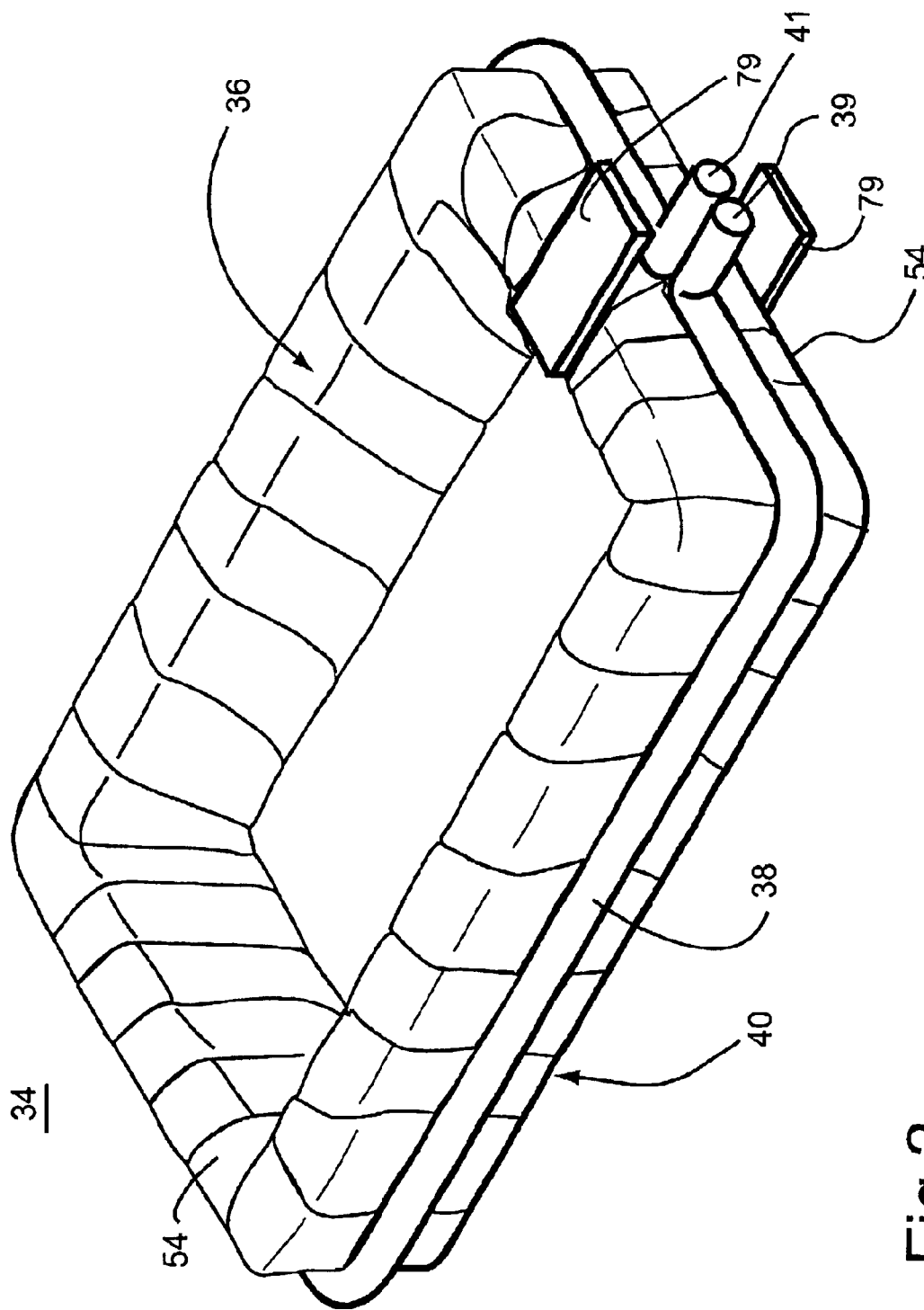
FIG. 2 is a perspective view of an exemplary race-track super-conducting coil winding.

The rotor 14 supports at least one longitudinally-extending, race-track shaped, high-temperature superconducting (HTS) coil winding 34 (See FIG. 2). The HTS coil winding may be alternatively a saddle-shape or have some other shape that is suitable for a particular HTS rotor design. A coil support system is disclosed here for a race-track SC coil winding. The coil support system may be adapted for coil configurations other than a race-track coil mounted on a solid rotor core.

The rotor includes a collector end shaft 24, and a drive end shaft 30, that are supported by bearings 25. The collector end shaft includes collector rings 78 that provide an external electrical contact to the SC coil via coil contacts 79. The collector end shaft 24 also has a cryogen transfer coupling 26 to a source of cryogenic cooling fluid used to cool the SC coil windings in the rotor. The cryogen transfer coupling 26 includes a stationary segment coupled to a source of cryogen cooling fluid and a rotating segment which provides cooling fluid to the HTS coil. The drive shaft 30 of the rotor may be driven by a power turbine via drive coupling 32.

FIG. 2 shows an exemplary HTS race-track field coil winding 34. The SC field winding coils 34 of the rotor includes a high temperature super-conducting (SC) coil 36. Each SC coil includes a high temperature super-conducting conductor, such as a BSCCO ($Bi_xSr_xCa_xCu_xO_x$) conductor wires laminated in a solid epoxy impregnated winding composite. For example, a series of BSCCO 2223 wires may be laminated, bonded together and wound into a solid epoxy impregnated coil.

SC wire is brittle and easy to be damaged. The SC coil is typically layer wound SC tape that is epoxy impregnated. The SC tape is wrapped in a precision coil form to attain close dimensional tolerances. The tape is wound around in a helix to form the race-track SC coil 36.

The dimensions of the race-track coil are dependent on the dimensions of the rotor core. Generally, each race-track SC coil encircles the magnetic poles of the rotor core, and is parallel to the rotor axis. The coil windings are continuous around the race-track. The SC coils form a resistance-free electrical current path around the rotor core and between the magnetic poles of the core. The coil has electrical contacts 79 that electrically connect the coil to the collector rings 78.

Fluid passages 38 for cryogenic cooling fluid are included in the coil winding 34. These passages may extend around an outside edge of the SC coil 36. The passageways provide cryogenic cooling fluid to the coil and remove heat from the coil. The cooling fluid maintains the low temperatures, e.g., 27° K., in the SC coil winding needed to promote super-conducting conditions, including the absence of electrical resistance in the coil. The cooling passages have an input fluid port 39 and an output port 41 at one end of the rotor core. These fluid (gas) ports 39, 41 connect the cooling passages 38 on the SC coil to passages that lead to the cryogen transfer coupling 26.

Each HTS race-track coil winding 34 has a pair of generally-straight side portions 40 parallel to a rotor axis 20, and a pair of end portions 54 that are perpendicular to the rotor axis. The side portions of the coil are subjected to the greatest centrifugal stresses. Accordingly, the side portions are supported by a coil support system that counteract the centrifugal forces that act on the coil.

The end sections 54 of the coil winding are subjected to significant bending moments as the rotor is accelerated and decelerated during operation of the machine. The end coil sections 54 extend radially across the end 56 of the rotor. Because the end section extends radially, the acceleration of the coil end section varies along its length. Thus, there are bending moments applied to the coil end section during acceleration and deceleration of the rotor. The bending moments applied to the end section may be more pronounced than any bending moments applied to the side section 40 of the coil.

Bending in a SC coil imparts mechanical strain to the brittle SC coil. Excessive strain in a SC coil can degrade the capacity of the coil to handle a critical current in super-conducting conditions. Accordingly, a coil support is needed for the end section 54 of the coil that prevents excessive bending of and strain in the coil. A split clamp 58 (FIG. 3) is applied to the coil end section. The split clamp imparts rigidity to the coil end section, and thereby prevents excessive bending and strain in the coil end section 54.

Figure 3:
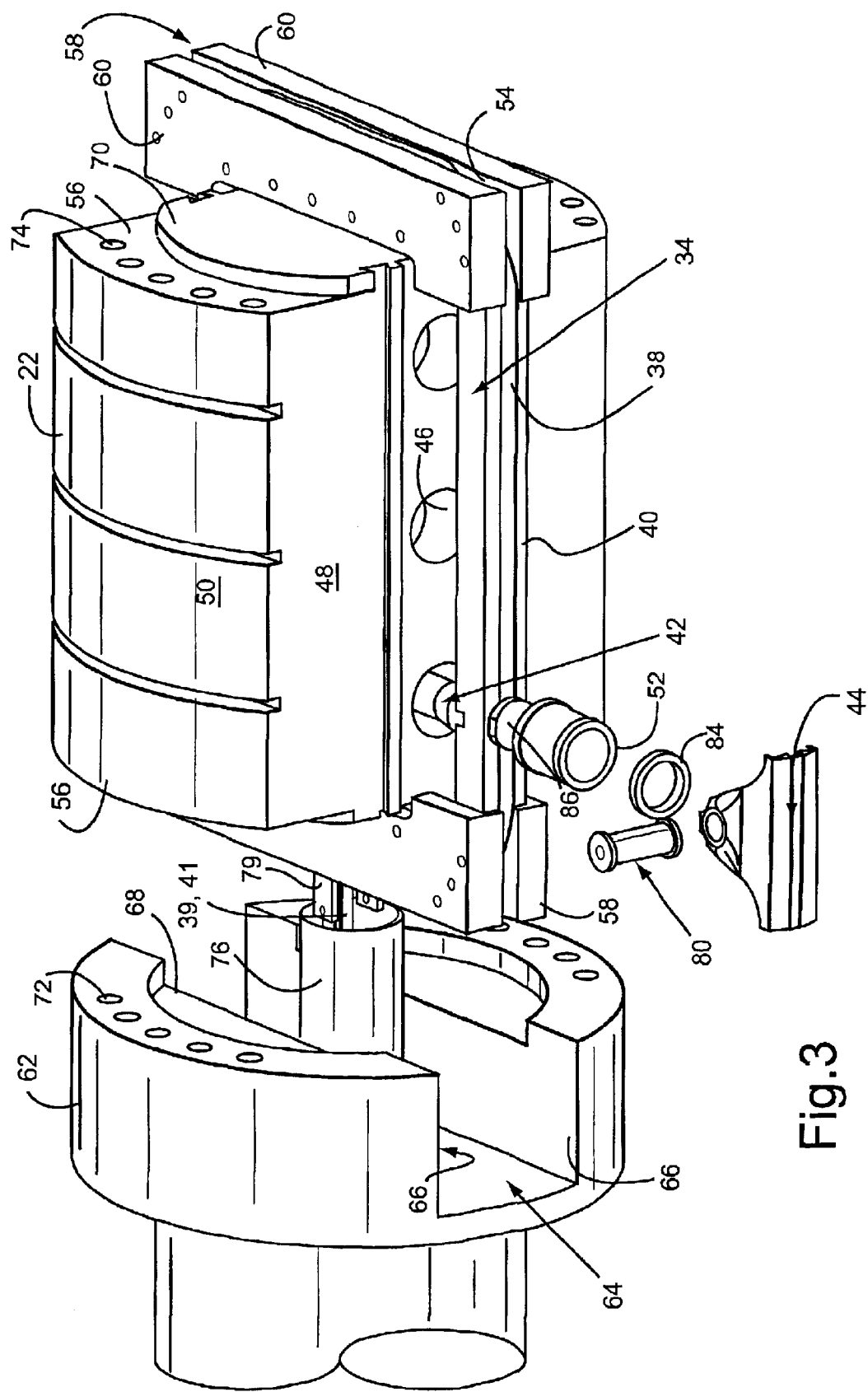
FIG. 3 is an exploded view of the components of a high temperature super-conducting (HTS) rotor.

FIG. 3 shows an exploded view of a rotor core 22 and coil support system for a high temperature super-conducting coil. The coil support system includes a split clamp 58 formed of a pair of plates 60 that sandwich the end section 54 of the coil. In addition, the coil support system includes supports for the long side 40 of the coil. These coil side 40 supports include tension rods 42 connected to channel housings 44. The housings hold and support the side portions 40 of the coil winding 34 in the rotor. While one tension rod and channel housing is shown in FIG. 3, the coil support system will generally include a series of tension rods that each have coil support housings at both ends of the rod. The tension rods and channel housings prevent damage to the coil winding during rotor operation, support the coil winding with respect to centrifugal and other forces, and provide a protective shield for the coil winding.

The principal loading of the HTS coil winding 34 in an iron core rotor is from centrifugal acceleration during rotor rotation, and from the acceleration and deceleration of rotor during shut-down and start-up. An effective coil structural support is needed to counteract the forces that act on the coil.

The end sections 54 of the coil winding 34 are adjacent the opposite ends 56 of the rotor core. A split-clamp 58 braces each of the coil end sections to better enable the coil end sections to withstand bending moments. The split clamp at each coil end 54 includes a pair of opposite plates 60 between which are sandwiched the end section 54 of the coil winding 34. The surface of each clamp plate includes channels 116, 118 (FIG. 6) to receive the coil winding 34 and the cooling fluid and electrical connections 39, 41, 79 to the winding.

The split clamp 58 stiffens the end section of the coil so as to minimize the bending of the end section. The split clamp reduces the strain in the coil by reducing the bending of the end-section of the coil. The split clamp may be formed of aluminum, Inconel alloys or stainless steel. The materials also have similar thermal expansion coefficient to the super-conducting laminated BSCCO 2223 super-conducting wire. Thus, the clamp has similar thermal expansion and contraction characteristics as does the coil. The split plates 60 of the clamp may be bonded together with the coil end section sandwiched between the plates. Alternatively, the plates may be assembled together with bolts, such that a small gap for the coil remains between the plates.

The coil support system, including the split clamps, is preferably non-magnetic so as to preserve ductility at cryogenic temperatures, since ferromagnetic materials become brittle at temperatures below the Curie transition temperature and cannot be used as load carrying structures.

The split clamp 58 is surrounded by, but is not in contact with, a collar 62 of the motor end shaft 24, 30. The collar 62 of each end shaft is coupled to an end 56 of the rotor core 22. Although only one collar is shown in FIG. 3, there are normally collars on both end shafts and attached to both ends of the core. The collar 62 is a thick disk of non-magnetic material, such as stainless steel, the same as or similar to the material, that forms the rotor shafts. Indeed, the collar is part of the rotor shaft. The collar has a slot 64 orthogonal to the rotor axis and sufficiently wide to receive and clear the split clamp 58. The split clamp is separated by a vacuum from the side-wall 66 of the collar. The hot side-walls 66 of the slot collar are spaced apart from the cold split clamp so they do not come in contact with each other.

The collar 62 may include a recessed disk area 68 (which is bisected by the slot 64) to receive a raised disk region 70 of the rotor core (see opposite side of rotor core for raised disk region to be inserted in opposite collar). The insertion of the raised disk region on the end 56 of the rotor core into the recessed disk 68 provides support to the rotor core in the collar, and assists in aligning the rotor core and collars. In addition, the collar may have a circular array of bolt holes 72 extending longitudinally through the collar and around the rim of the collar. These bolt holes correspond to matching threaded bolt holes 74 that extend partially through the rotor core. Threaded bolts (not shown) extend through these longitudinal bolt holes 72, 74 and secure the collars to the rotor core.

A side coil support is needed along the side sections 40 of the coil that experience the most centrifugal acceleration. To support the side sections 40 of the coil, the tension rods 42 span between the sections of the coil and attach to the channel housings 44 that grasp opposite side sections of the coil. The tension rods extend through conduits 46, e.g., apertures, in the rotor core so that the rods may span between side sections of the same coil or between adjacent coils.

The conduits 46 are generally cylindrical passages in the rotor core having a straight axis. The diameter of the conduits is substantially constant, except at their ends near the recessed surfaces of the rotor. At their ends, the conduits may expand to a larger diameter to accommodate a non-conducting cylindrical tube 52 that provides slidable bearing surface and thermal isolation between the rotor core and the tension rod. The tube is held in the core conduit by a lock-nut 84.

The axes of the conduits 46 are generally in a plane defined by the race-track coil. In addition, the axes of the conduits are perpendicular to the side sections of the coil to which are connected the tension rods that extends through the conduits. Moreover, the conduits are orthogonal to and intersect the rotor axis, in the embodiment shown here. The number of conduits and the location of the conduits will depend on the location of the HTS coils and the number of coil housings needed to support the side sections of the coils.

The tension rods support the coil especially well with respect to centrifugal forces as the rods extend substantially radially between the sides of the coil winding. Each tension rod is a shaft with continuity along the longitudinal direction of the rod and in the plane of the race-track coil. The longitudinal continuity of the tension rods provides lateral stiffness to the coils which provides rotor dynamics benefits. Moreover, the lateral stiffness permits integrating the coil support with the coils so that the coil can be assembled with the coil support prior to final rotor assembly. Pre-assembly of the coil and coil support reduces production cycle, improves coil support quality, and reduces coil assembly variations. The race-track coil is supported by an array of tension members that span the long sides of the coil. The tension rod coil support members are pre-assembled to coil.

The HTS coil winding and structural support components are at cryogenic temperature. In contrast, the rotor core is at ambient "hot" temperature. The coil supports are potential sources of thermal conduction that would allow heat to reach the HTS coils from the rotor core. The rotor becomes hot during operation. As the coils are to be held in super-cooled conditions, heat conduction into the coils is to be avoided. The rods extend through apertures, e.g., conduits, in the rotor but are not in contact with the rotor. This lack of contact avoids the conduction of heat from the rotor to the tension rods and coils.

To reduce the heat leaking away from the coil, the coil support is minimized to reduce the thermal conduction through support from heat sources such as the rotor core. There are generally two categories of support for super-conducting winding: (i) "warm" supports and (ii) "cold" supports. In a warm support, the supporting structures are thermally isolated from the cooled SC windings. With warm supports, most of the mechanical load of a super-conducting (SC) coil is supported by structural members spanning from cold to warm members.

In a cold support system, the support system is at or near the cold cryogenic temperature of the SC coils. In cold supports, most of the mechanical load of a SC coil is supported by structural members which are at or near a cryogenic temperature. The exemplary coil support system disclosed here is a cold support in that the tension rods and associated housings that couple the tension rods to the SC coil windings are maintained at or near a cryogenic temperature. Because the supporting members are cold, these members are thermally isolated, e.g., by the non-contact conduits through the rotor core, from other "hot" components of the rotor.

A dowel pin 80 connects the housing 44 to the end of the tension rod. Each channel housing 44 is a U-shaped bracket having legs that connect to a tension rod and a channel to receive the coil winding 34. The U-shaped channel housing allows for the precise and convenient assembly of the support system for the coil. A series of channel housings may be positioned end-to-end along the side of the coil winding. The channel housings collectively distribute the forces that act on the coil, e.g., centrifugal forces, over substantially the entire side sections 40 of each coil.

The channel housings 44 prevent the side sections 40 of the coils from excessive flexing and bending due to centrifugal forces. The coil supports do not restrict the coils from longitudinal thermal expansion and contraction that occur during normal start/stop operation of the gas turbine. In particular, thermal expansion is primarily directed along the length of the side sections. Thus, the side sections of the coil slide slightly longitudinally with respect to the channel housing and tension rods.

The transfer of the centrifugal load from the coil structure to a support rod is through the channel housing that fits around the coil outside surface and side straight sections, and is doweled by pins 80 to a wide diameter end of the tension rod. The U-shaped channel housings are formed of a light, high strength material that is ductile at cryogenic temperatures. Typical materials for channel housing are aluminum, Inconel, or titanium alloys, which are non-magnetic. The shape of the U-shaped housing may be optimized for low weight and strength.

The dowel pin 80 extends through apertures in the channel housing and tension rod. The dowel may be hollow for low weight. Locking-nuts (not shown) are threaded or attached at the ends of the dowel pin to secure the U-shaped housing and prevent the sides of the housing from spreading apart under load. The dowel pin can be made of high strength Inconel or titanium alloys. The tension rods are made with larger diameter ends that are machined with two flats 86 at their ends to fit the U-shaped housing and coil width. The flat ends 86 of the tension rods abut the inside surface of the HTS coils, when the rod, coil and housing are assembled together. This assembly reduces the stress concentration at the hole in the tension rod that receives the dowel.

The coil support system of tension rods 42, channel housings 44 and split-clamp 58 may be assembled with the HTS coil windings 34 as both are mounted on the rotor core 22. The tension rods, channel housings and clamp provide a fairly rigid structure for supporting the coil windings and holding the coil windings in place with respect to the rotor core.

Each tension rod 42 extends through the rotor core, and may extend orthogonally through the axis 20 of the rotor. Conduits 46 through the rotor core provide a passage through which extend the tension rods. The diameter of the conduits is sufficiently large to avoid having the hot rotor walls of the conduits be in contact with the cold tension rods. The avoidance of contact improves the thermal isolation between the tension rods and the rotor core.

The rotor core 22 is typically made of magnetic material such as iron, while the rotor end shafts are typically made of non-magnetic material such as stainless steel. The rotor core and end shafts are typically discrete components that are assembled and securely joined together by either bolting or welding.

The iron rotor core 22 has a generally cylindrical shape suitable for rotation within the rotor cavity 16 of the stator 12. To receive the coil winding, the rotor core has recessed surfaces 48, such as flat or triangular regions or slots. These surfaces 48 are formed in the curved surface of the cylindrical core and extending longitudinally across the rotor core. The coil winding 34 is mounted on the rotor adjacent the recessed areas 48. The coils generally extend longitudinally along an outer surface of the recessed area and around the ends of the rotor core. The recessed surfaces 48 of the rotor core receive the coil winding. The shape of the recessed area conforms to the coil winding. For example, if the coil winding has a saddle-shape or some other shape, the recess(es) in the rotor core would be configured to receive the shape of the winding.

The recessed surfaces 48 receive the coil winding such that the outer surface of the coil winding extends to substantially an envelope defined by the rotation of the rotor. The outer curved surfaces 50 of the rotor core when rotated define a cylindrical envelope. This rotation envelope of the rotor has substantially the same diameter as the rotor cavity 16 (see FIG. 1) in the stator.

The gap between the rotor envelope and stator cavity 16 is a relatively-small clearance, as required for forced flow ventilation cooling of the stator only, since the rotor requires no ventilation cooling. It is desirable to minimize the clearance between the rotor and stator so as to increase the electromagnetic coupling between the rotor coil windings and the stator windings. Moreover, the rotor coil winding is preferably positioned such that it extends to the envelope formed by the rotor and, thus, is separated from the stator by only the clearance gap between the rotor and stator.

The rotor core may be encased in a metallic cylindrical shield (not shown) that protects the super-conducting coil winding 34 from eddy currents and other electrical currents that surround the rotor and provides the vacuum envelope as required to maintain hard vacuum around the cryogenic components of the rotor. The cylindrical shield may be formed of a highly-conductive material, such as a copper alloy or aluminum.

The SC coil winding 34 is maintained in a vacuum. The vacuum may be formed by the shield which may include a stainless steel cylindrical layer that forms a vacuum vessel around the coil and rotor core.

Figure 4:
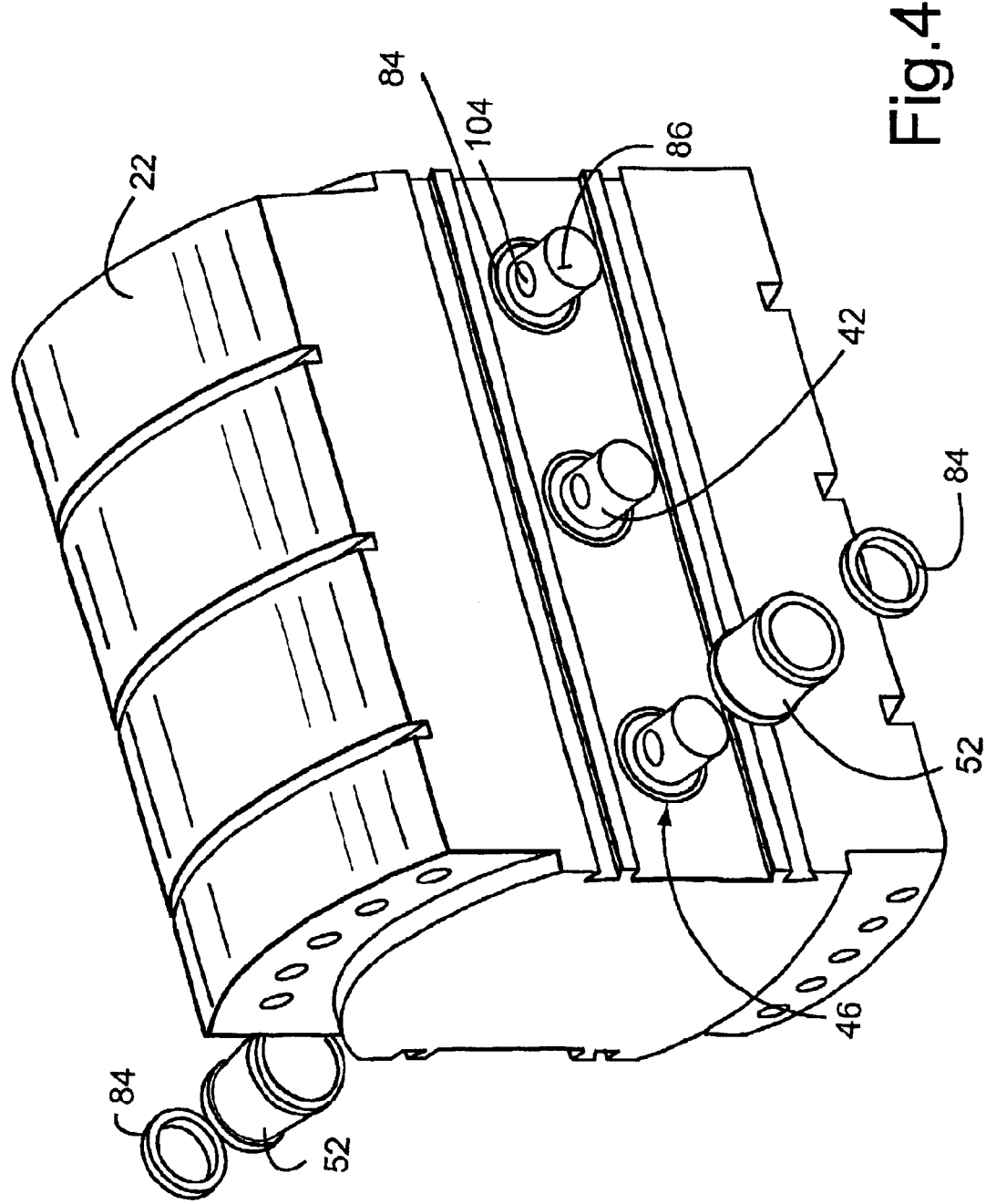
FIGS. 4 to 6 are perspective views showing the assembly process for the HTS rotor shown in FIG. 3.
Figure 5:
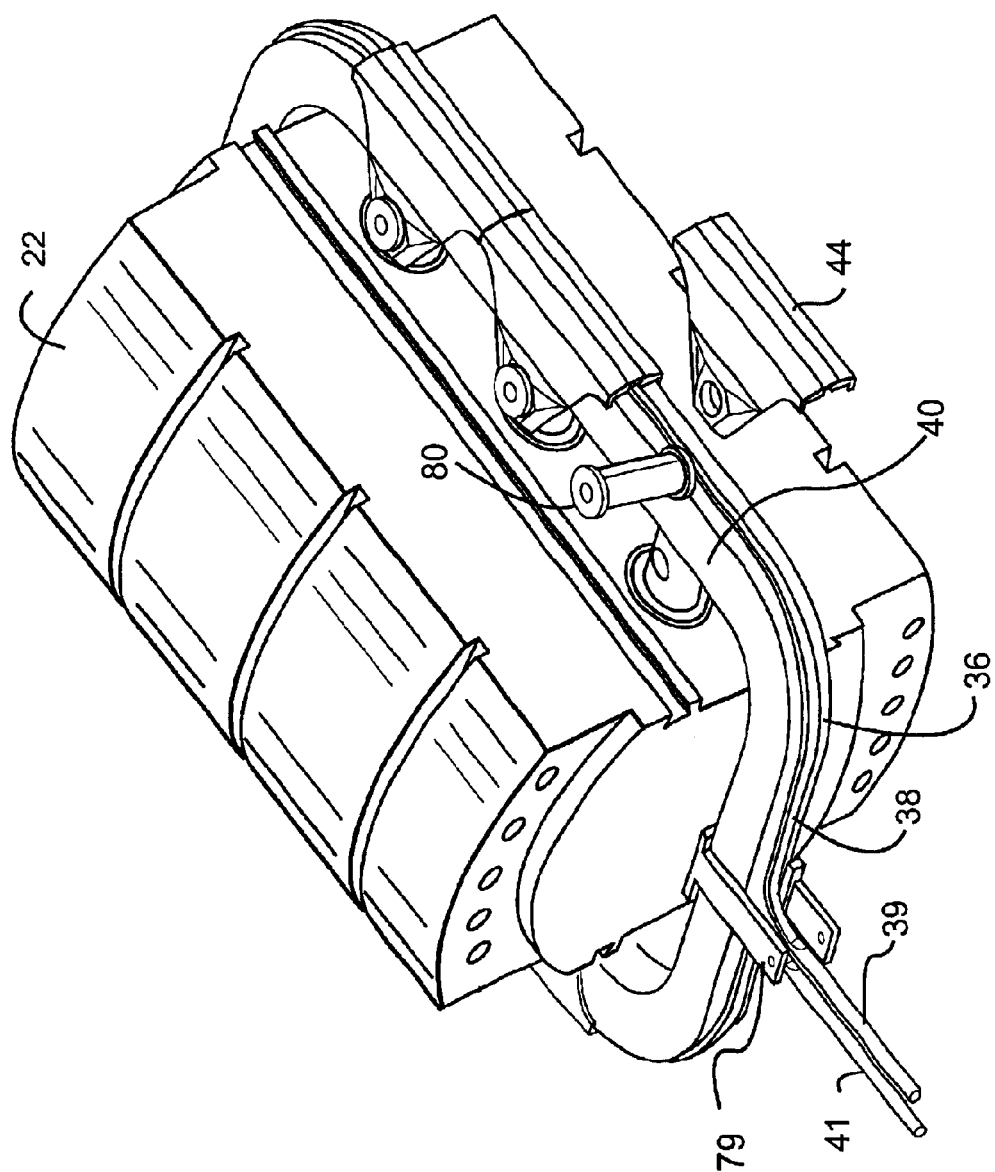
Figure 6:
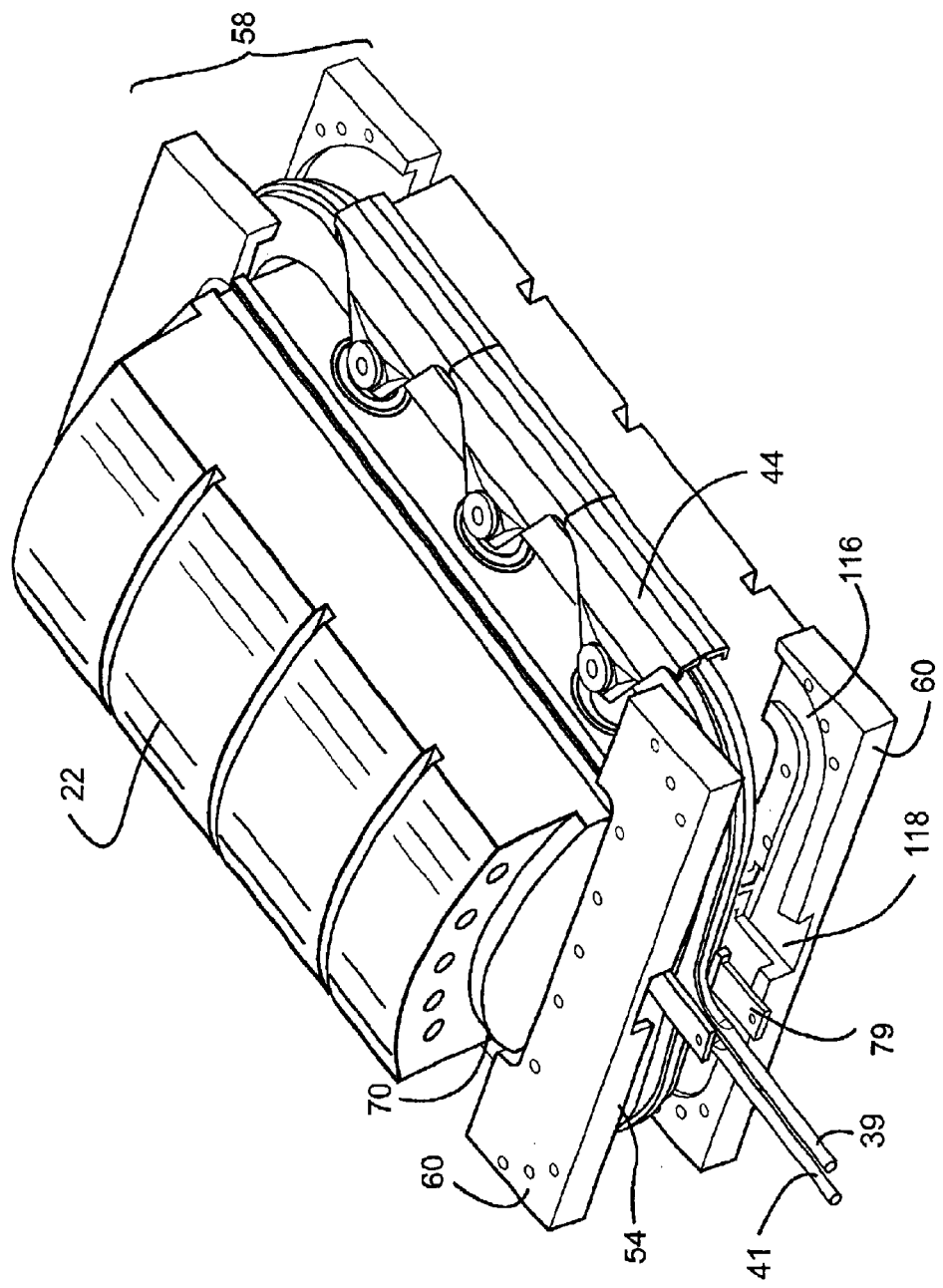

FIGS. 4, 5 and 6 show schematically the assembly process for the coil support structure and coil winding in the rotor. As shown in FIG. 4, before the rotor core is assembled with the collars and other components of the rotor, the tension rods 42 are inserted into each of the conduits 46 that extend through the rotor core. The insulator tube 52 at each end of each tension rod is placed in the expanded end at each end of the conduits 46. The tube 52 is locked in place by a retainer locking-nut 84. When the tension rods are assembled in the rotor core 22, the coil windings are ready to be inserted onto the core.

As shown in FIG. 5, the SC coil 36 is inserted onto the rotor core such that the flat ends 86 of the tension rods 42 abut the inside surface of the side sections 40 of the SC coil. Once the winding has been inserted over the ends of the tension bar, the channel housings 44 are inserted over the SC coil. The channel housings are secured to the ends of the tension bars by inserting dowels 80 through the apertures in the tension rod and channel housing 104, 108, respectively.

The channel housing 44 includes a slot along its upper inside surface which receives the cooling conduit 38 and holds that conduit against the coil 36.

The plurality of channel housings effectively hold the coil in place without affectation by centrifugal forces. Although the channel housings are shown as having a close proximity to one another, the housings need only be as close as necessary to prevent degradation of the coil caused by high bending and tensile strains during centrifugal loading, torque transmission, and transient fault conditions.

The channel housings and tension rods may be assembled with the coil winding before the rotor core and coils are assembled with the collar and other components of the rotor. Accordingly, the rotor core, coil winding and coil support system can be assembled as a unit before assembly of the other components of the rotor and of the synchronous machine.

FIG. 6 shows the assembly of the split clamp 58 that is formed by clamp plates 60. The clamp plates 60 sandwiched between them the end sections 54 of the coil winding. The split clamp provides structural support for the ends of the coil winding 34. The plates 60 of the split clamp include on their inside surfaces channels 116 that receive the coil winding. Similarly, the plates include channels 118 for the input/output lines 39, 41 for the gases and for the input and output current connections 79 to the coil. Once the coil supports, coil, collar and rotor core are assembled, this unit is ready to be assembled into the rotor and synchronous machine.

While the invention has been described in connection with what is presently considered to be the most practical and preferred embodiment, it is to be understood that the invention is not to be limited to the disclosed embodiment, but on the contrary, is intended to cover all embodiments within the spirit of the appended claims.

What is claimed is:

1. In a synchronous machine, a rotor comprising:

a rotor core;

a super-conducting coil winding extending around at least a portion of the rotor core, said coil winding having a coil end section adjacent an end of said rotor core, and end coil support attached to and bracing said end section and being thermally isolated from said rotor core, wherein the end coil support abuts at least one side surface of said coil end section, wherein said at least one side surface is in a plane substantially parallel to a rotor axis and said end coil support is wider than a width of the coil end section and abuts an entirety of the width of the side of the coil end section.

2. In a rotor as in claim 1 wherein said at least one side surface of said coil end section is a pair of side surfaces of the coil end section, and said end coil support is a split clamp having a pair of opposing surfaces abutting the pair of side surfaces of the coil end section, wherein said opposing surfaces are each in a plane substantially parallel to said rotor axis.

3. In a rotor as in claim 1 wherein said at least one side surface of said coil end section is a pair of side surfaces of the coil end section, and the end coil support includes a pair of plates between which sandwich the coil end section and said pair of plates each has a plate surface abutting one of the pair of side surfaces of the coil end section, wherein said plate surfaces are each in a respective plane substantially parallel to said rotor axis.

4. In a rotor as in claim 1 further comprising a cryogenic coupling providing cooling fluid to said coil winding, wherein said end coil support is cooled by conduction from said coil winding.

5. In a rotor as in claim 1 further comprising a rotor end shaft having a slot to receive said coil end section and end coil support, and said end shaft is thermally isolated from said end coil support.

6. In a rotor as in claim 1 wherein said end coil support braces an entire length of said coil end section.

7. In a rotor as in claim 1 wherein said end coil support is transverse to an axis of the rotor core.

8. In a rotor as in claim 1 further comprising a second coil end section adjacent a second end of said rotor core, and a second coil support bracing the second end coil end section.

9. In a rotor as in claim 1 further comprising side coil supports attached to a long side section of said coil.

10. In a rotor as in claim 9 wherein said side coil supports further comprises at least one tension rod extending transversely through said rotor core, and coil housings attached to opposite ends of the tension rod, wherein said coil housings each attached to an opposite long side section of the coil.

11. In a rotor as in claim 10 wherein said tension rod extends through a conduit in the rotor core.

12. A method for supporting a super-conducting coil winding on a rotor core of a synchronous machine comprising the steps of:
 a. bracing an end section of the coil winding with an end coil support attached to at least one side of the end section in a plane substantially parallel to a rotor core axis, and wherein the end coil support is wider than the at least one side of the end section of the coil winding and abuts an entirety of a width of the side of the end section;
 b. assembling the coil winding, end coil support and rotor core;
 c. attaching a rotor end shaft to said rotor core;
 d. thermally isolating the end coil support from the rotor core and shaft.

13. A method as in claim 12 wherein said at least one side surface of said end section is a pair of side surfaces on the end section, and wherein the end section is braced with a split clamp having a pair of opposing surfaces abutting the pair of side surfaces, wherein said opposing surfaces are each in a respective plane substantially parallel to said rotor axis.

14. A method as in claim 12 wherein the assembling step includes inserting the end section of the coil and the coil support into a slot of the rotor end shaft.

15. A method as in claim 12 wherein said at least one side surface of said end section is a pair of side surfaces of the coil end section, and the bracing step includes applying plates to the pair of side surfaces of the end section, wherein the plates have opposite surfaces that are substantially parallel to the rotor coil axis.

16. A method as in claim 12 further comprising cryogenically cooling the coil, and cooling said end coil support by heat transfer between the coil and the coil support.

17. A rotor for a synchronous machine comprising: a rotor core having at least one rotor core end orthogonal to a longitudinal axis of the rotor;
 at least one end shaft attached to said rotor core end;
 a race-track super-conducting (SC) coil winding extending around said rotor core and having a coil end section adjacent said rotor end;
 a coil support brace attached to said coil end section and thermally isolated from said rotor core and rotor end shaft, wherein the coil support brace abuts an entirety of a width of at least one side surface of the coil end section, wherein said at least one side surface is substantially parallel to the axis of the rotor, and said coil support brace is wider than the at least one side surface of the coil end section, and covers the end section.

18. In a rotor as in claim 17 wherein said coil support brace is a split clamp.

19. In a rotor as in claim 17 wherein the coil support brace includes a pair of plates between which are sandwiched the coil end section.

20. In a rotor as in claim 17 further comprising a cryogenic coupling providing cooling fluid to said coil winding, wherein said coil support is cooled by conduction from said coil winding.

21. In a rotor as in claim 17 wherein said rotor end shaft has a slot to receive said coil end section and coil support, and said end shaft is thermally isolated from said coil support.

22. In a rotor as in claim 17 wherein said coil support brace covers an entire length of said coil end section.

23. In a rotor as in claim 17 wherein said coil support brace is transverse to an axis of the rotor core.

24. In a rotor as in claim 17 further comprising a second coil end section adjacent a second end of said rotor core, and a second coil support brace attached to the second coil end section.

25. In a rotor as in claim 17 further comprising coil side supports attached to a long side section of said coil.

26. In a rotor as in claim 17 further comprising at least one tension rod extending transversely through said rotor core, and coil housings attached to opposite ends of the tension rod, wherein said coil housings each attached to an opposite long side section of the coil.

27. In a rotor as in claim 17 wherein said tension rod extends through a conduit in the rotor core.

* * * * *